United States Patent
Saito et al.

(10) Patent No.: US 10,213,080 B2
(45) Date of Patent: Feb. 26, 2019

(54) AUTONOMOUS TRAVELING BODY DEVICE

(71) Applicant: TOSHIBA LIFESTYLE PRODUCTS & SERVICES CORPORATION, Kawasaki-shi (JP)

(72) Inventors: Seiji Saito, Shinagawa (JP); Koichi Watanabe, Shinagawa (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 185 days.

(21) Appl. No.: 15/503,520

(22) PCT Filed: Aug. 21, 2015

(86) PCT No.: PCT/JP2015/073505
§ 371 (c)(1),
(2) Date: Feb. 13, 2017

(87) PCT Pub. No.: WO2016/031702
PCT Pub. Date: Mar. 3, 2016

(65) Prior Publication Data
US 2017/0231452 A1    Aug. 17, 2017

(30) Foreign Application Priority Data
Aug. 27, 2014    (JP) .................................. 2014-173160

(51) Int. Cl.
*A47L 9/28*    (2006.01)
*G05D 1/02*    (2006.01)

(52) U.S. Cl.
CPC .............. *A47L 9/2852* (2013.01); *A47L 9/28* (2013.01); *A47L 9/2805* (2013.01);
(Continued)

(58) Field of Classification Search
CPC .... A47L 9/2852; A47L 9/2894; A47L 9/2805; A47L 9/2873; A47L 9/28; A47L 2201/04; A47L 2201/022; G05D 1/02
See application file for complete search history.

(56) References Cited

U.S. PATENT DOCUMENTS 8,380,350 B2    2/2013    Ozick et al.
8,606,401 B2    12/2013    Ozick et al.
(Continued)

FOREIGN PATENT DOCUMENTS

EP    1 760 564 A2    3/2007
JP    2003-36116 A    2/2003
(Continued)

OTHER PUBLICATIONS

International Search Report dated Nov. 2, 2015 in PCT/JP15/073505 Filed Aug. 21, 2015.

*Primary Examiner* — Alan D Hutchinson
(74) *Attorney, Agent, or Firm* — Oblon, McClelland, Maier & Neustadt, L.L.P.

(57) ABSTRACT

In a first mode, a control unit controls operation of driving wheels so that a main casing is made to travel straight and, upon detection of an object by an object sensor, the main casing is changed in traveling direction and made to travel straight. In a second mode, the control unit controls the operation of the driving wheels so that the main casing travels in a curved shape along an object detected by the object sensor. When a charging device is not found by a signal reception part during traveling within a region by the first mode, the control unit is changed over to the second mode. The control unit is changed over to the first mode when it is decided a specified number of times or more that the main casing has moved to a different region by the second mode.

5 Claims, 10 Drawing Sheets

(52) U.S. Cl.
CPC .......... *A47L 9/2873* (2013.01); *A47L 9/2894* (2013.01); *G05D 1/02* (2013.01); *A47L 2201/022* (2013.01); *A47L 2201/04* (2013.01)

(56) References Cited

U.S. PATENT DOCUMENTS

| | | | |
|---|---|---|---|
| 8,954,192 | B2 | 2/2015 | Ozick et al. |
| 9,144,360 | B2 | 9/2015 | Ozick et al. |
| 9,149,170 | B2 | 10/2015 | Ozick et al. |
| 2003/0025472 | A1 | 2/2003 | Jones et al. |
| 2007/0050086 | A1 | 3/2007 | Lim et al. |
| 2009/0055022 | A1 | 2/2009 | Casey et al. |
| 2010/0174408 | A1 | 7/2010 | Vroomen |
| 2011/0118928 | A1* | 5/2011 | Yoo ................. A47L 9/2805 701/26 |
| 2013/0289816 | A1 | 10/2013 | Vroomen |
| 2016/0075024 | A1 | 3/2016 | Ozick et al. |
| 2016/0291595 | A1 | 10/2016 | Halloran et al. |

FOREIGN PATENT DOCUMENTS

| | | |
|---|---|---|
| JP | 2004-139264 A | 5/2004 |
| JP | 2004-522231 A | 7/2004 |
| JP | 2007-66292 A | 3/2007 |
| JP | 2009-112723 A | 5/2009 |
| JP | 2010-531485 A | 9/2010 |
| JP | 2012-178162 A | 9/2012 |
| WO | WO 2013/085085 A1 | 6/2013 |

\* cited by examiner

AUTONOMOUS TRAVELING BODY DEVICE

CROSS-REFERENCE TO RELATED APPLICATIONS

The present application is a National Stage Application of PCT/JP2015/073505 filed on Aug. 21, 2015. The PCT application acclaims priority to Japanese Patent Application No. 2014-173160 filed on Aug. 27, 2014. All of the above applications are herein incorporated by reference.

FIELD

Embodiments described herein relate generally to an autonomous traveling body device which includes a station device installed on a traveling surface, and an autonomous traveling body enabled to autonomously travel on the traveling surface.

ART

Conventionally, there is known a so-called autonomous-traveling type vacuum cleaner (cleaning robot) which cleans a cleaning-object surface while autonomously traveling on the cleaning-object surface and while detecting obstacles or the like by using a sensor as an example. Such a vacuum cleaner, once cleaning in a room has ended, searches for an installed specified station device, e.g., a charging device (charging stand). The charging device transmits a beacon for guiding the vacuum cleaner. The vacuum cleaner, having received the beacon, travels along the beacon toward the charging device, thereafter docking with the charging device, by which the cleaning is ended while a built-in secondary battery is charged.

When the vacuum cleaner searches for the charging device so as to be docked therewith as described above, the secondary battery has been consumed to some degree through the cleaning and traveling. Therefore, it is desired to find the charging device as early and efficiently as possible. In particular, in a cleaning place having a plurality of divided regions such as a plurality of rooms, there may be cases where a region in which the vacuum cleaner is present and a region in which the charging device is installed differ from each other. In such cases, it is desired that the charging device be found in short time.

CITATION LIST

Patent Literature

PTL 1: Japanese Laid-open Patent Publication No. 2012-178162

Technical Problem

An object of the invention is to provide an autonomous traveling body device in which an autonomous traveling body is enabled to find a station device more efficiently.

Solution to Problem

In one embodiment, there is provided an autonomous traveling body device including a station device and an autonomous traveling body. The station device is installed on a traveling surface. The autonomous traveling body includes a main casing, driving wheels, an object sensor, a station device sensor, and a control unit. The driving wheels enable the main casing to travel on the traveling surface. The object sensor is provided in the main casing and serves for detecting presence or absence of an object within a specified distance. The station device sensor detects the station device. The control unit controls operation of the driving wheel based on detection by the object sensor and the station device sensor to thereby make the main casing autonomously travel. The control unit has a first traveling mode and a second traveling mode. In the first traveling mode, the control unit controls the operation of the driving wheel so that the main casing is made to travel straight and, upon detection of an object by the object sensor, the main casing is changed in traveling direction and made to travel straight. In the second traveling mode, the control unit controls the operation of the driving wheels so that the main casing travels in a curved shape along an object detected by the object sensor. The control unit is changed over to the second traveling mode when the station device is not found by the station device sensor during traveling within a region by the first traveling mode. Also, the control unit is changed over to the first traveling mode when it is decided a specified number of times or more that the main casing has moved to a different region by the second traveling mode.

DETAILED DESCRIPTION

Hereinbelow, a first embodiment of the invention will be described in terms of its constitution with reference to the accompanying drawings.

Figure 1:
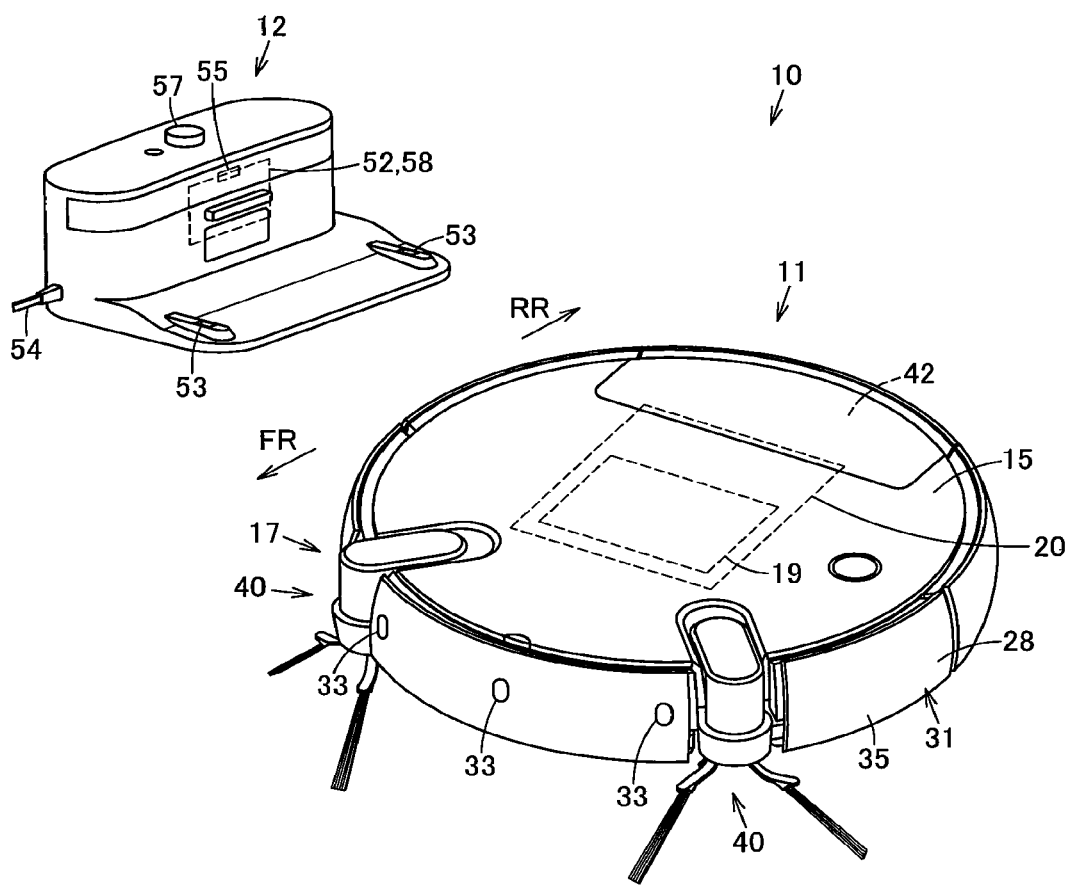
FIG. 1 is a perspective view showing an autonomous traveling body device according to a first embodiment.

In FIG. 1, reference sign 10 denotes a vacuum cleaner device as an autonomous traveling body device. This vacuum cleaner device 10 includes a vacuum cleaner main body 11 as an autonomous traveling body, and a charging device (charging stand) 12 for charging use serving as a station device of the vacuum cleaner main body 11.

Figure 2:
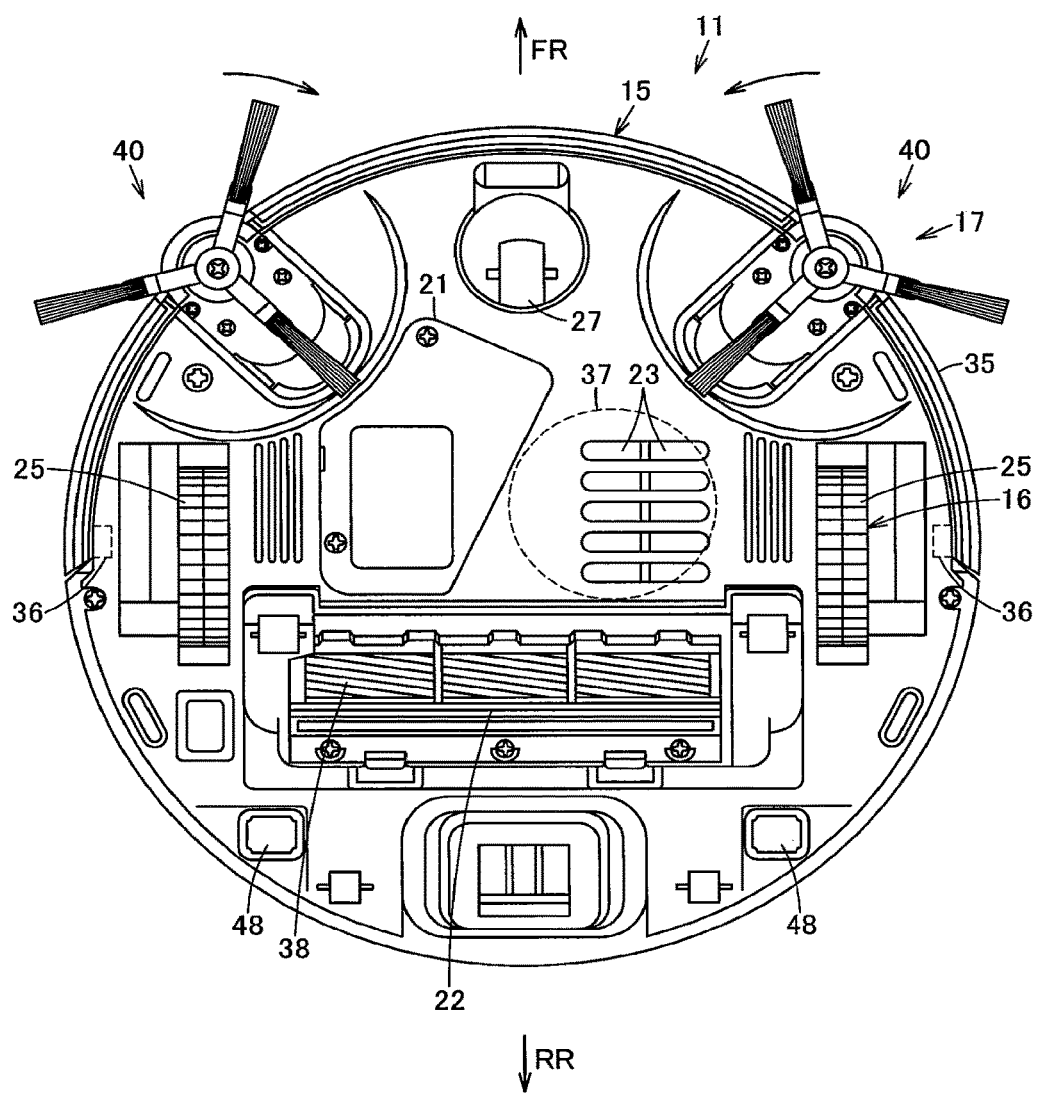
FIG. 2 is a plan view showing the autonomous traveling body of the autonomous traveling body device as viewed from below.
Figure 3:
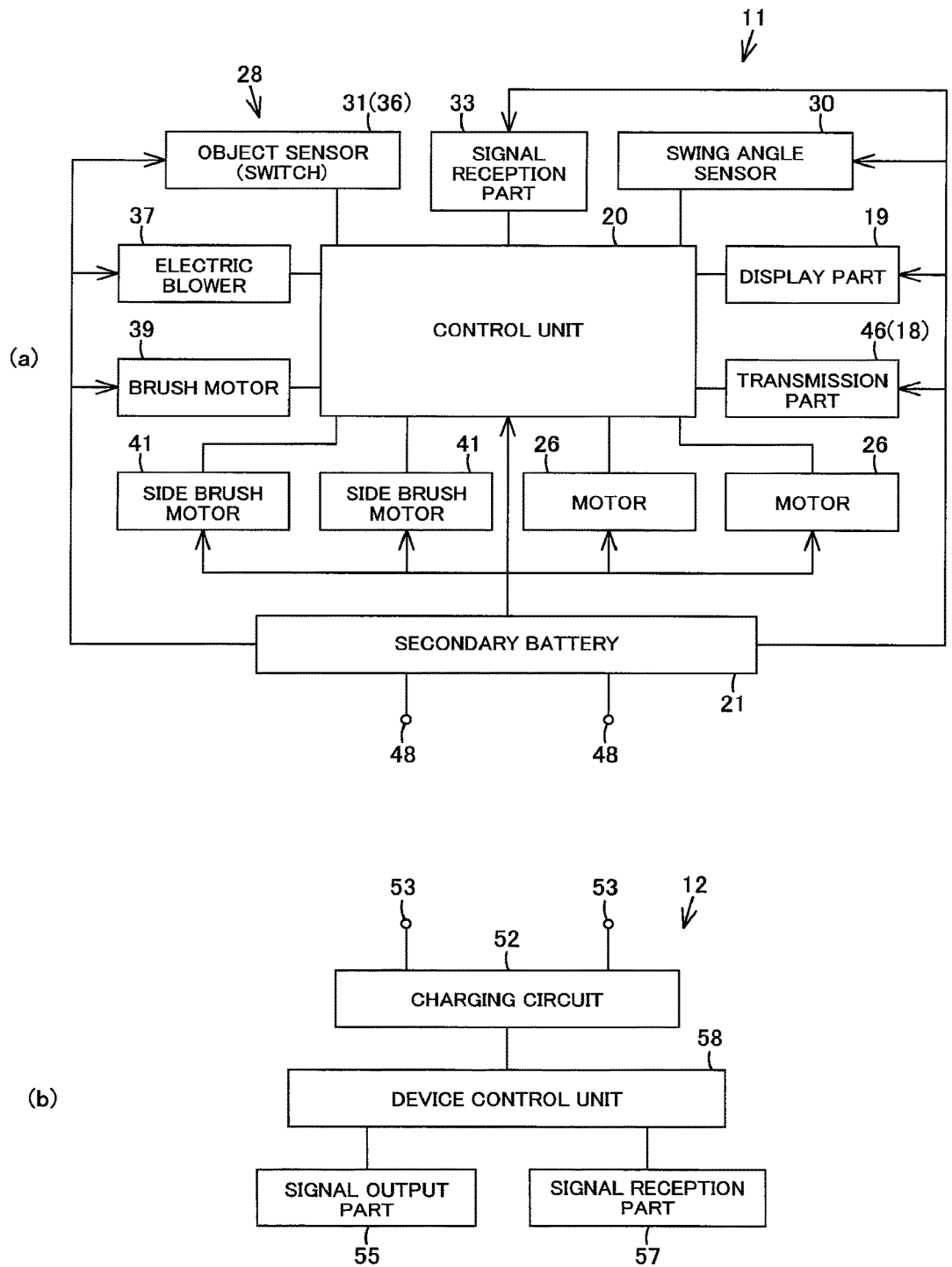
FIG. 3A is a block diagram showing an internal structure of the autonomous traveling body.
FIG. 3B is a block diagram showing an internal structure of a station device of the autonomous traveling body device.

As shown in FIGS. 1, 2 and 3A, the vacuum cleaner main body 11 in this embodiment is a so-called self-propelled robot cleaner (cleaning robot) which cleans a floor surface being a cleaning-object surface as a traveling surface while autonomously traveling (self-propelled to travel) on the floor surface. The vacuum cleaner main body 11 includes a hollow main casing 15, a traveling part 16 for making the main casing 15 travel on a floor surface, a cleaning unit 17 for cleaning dust and dirt on the floor surface or the like, a communication part 18 for communicating with external devices including the charging device 12, a display part 19 for displaying various types of information, a control unit (controller) 20 as control means for controlling the traveling part 16, the cleaning unit 17, the communication part 18 and the display part 19, and a secondary battery 21 for supplying electric power to those traveling part 16, cleaning unit 17, communication part 18, display part 19, control unit 20 and the like. Hereinafter, a direction extending along the traveling direction of the vacuum cleaner main body 11 (main casing 15) is assumed as a back-and-forth direction (directions of arrows FR and RR shown in FIGS. 1 and 2) while a left-and-right direction (directions toward both sides) intersecting (orthogonally crossing) the back-and-forth direction is assumed as a widthwise direction. Also, a direction indicated by arrow X shown in FIGS. 4A and 4B or the like is assumed to represent a front side of the vacuum cleaner main body 11 (main casing 15).

The main casing 15 is formed into a flat columnar shape (disc shape) or the like from a synthetic resin as an example. A suction port 22 and an exhaust port 23 are opened in a lower surface of the main casing 15 facing the floor surface.

The traveling part 16 includes driving wheels 25, 25 as a plurality (pair) of driving parts, motors 26, 26 being driving means (drive members) as operating parts for driving the driving wheels 25, 25, a swing wheel 27 for swinging use, a sensor part 28 having various types of sensors, and the like.

Each of the driving wheels 25 make the vacuum cleaner main body 11 (main casing 15) travel (autonomously travel) in an advancing direction or a retreat direction on the floor surface, hence the driving wheels 25 being for traveling use. The driving wheels 25, having an unshown rotating shaft extending along the left-and-right widthwise direction, are placed symmetrically with each other in the widthwise direction.

Each of the motors 26 is placed, for example, in correspondence to the driving wheels 25, respectively, and enabled to drive the driving wheels 25 independently of each other.

The swing wheel 27, which is positioned at a generally central and front portion in the widthwise direction of the lower surface of the main casing 15, is a driven wheel swingable along a floor surface.

The sensor part 28 includes; a swing angle sensor 30 as swing angle detection means (swing angle detection part) for detecting a swing angle of the main casing 15 as an example; an object sensor 31 as object detection means which is an obstacle detection means (obstacle sensor) for detecting the presence or absence of an object (obstacle) such as a wall or furniture within a specified distance; and a signal reception part 33 which is signal reception means as station device detection means (station device sensor) such as a phototransistor for receiving a radio signal (infrared signal) from the charging device 12 or the like. The sensor part 28 may additionally include unshown step gap detection means (step gap sensor) such as an infrared sensor for detecting a step gap of a floor surface or the like as an example, unshown dust-and-dirt amount detection means (dust-and-dirt amount sensor) for detecting an amount of dust and dirt on a floor surface, anti-collision signal detection means (anti-collision sensor) such as an infrared sensor for anti-collision use against the charging device 12 or the like, and others.

The swing angle sensor 30 is, for example, an optical encoder for measuring numbers of rotations of the left-and-right motors 26 (driving wheels 25), respectively, and is configured to detect a swing angle of the main casing 15 by the measured numbers of rotations.

The object sensor 31, in this embodiment, is a contact sensor having a bumper 35 which is a circular-arc shaped, movable contactor configuring a front-side half of the main casing 15, and switches 36 which are to be actuated by movement of the bumper 35, and detects contact between the bumper 35 and an object. That is, the object sensor 31 in this embodiment is adapted to detect an object that comes into contact with (located at zero distance to) the main casing 15.

The bumper 35, which is movable along a radial direction of the main casing 15, is biased in such a direction as to be protruded from the main casing 15 by unshown biasing means (biaser) such as a spring as an example. In addition, the bumper 35 may also be formed, for example, into a semicircular-arc shape continuing from one side via the front portion to the other side of the main casing 15, or into circular-arc shapes resulting from plural division of a semi-circular-arc region ranging from one side via the front portion to the other side of the main casing 15. In the case of such a configuration in which the bumper 35 is plurally divided, the bumpers 35 are preferably disposed in left-and-right symmetry, for example, divided into three areas, namely a front side and left-and-right both sides, or the like.

The switches 36 are actuated, i.e. changed over between an on and an off state, by contact with the bumper 35 that has relatively retreated due to contact with an object, the switches 36 being disposed at least on both sides of the main casing 15, opposite to each other, at back face-side portions of the bumper 35. Then, by changeover between on/off states in any one of these switches 36, it becomes possible to detect a contact of the bumper 35 with an object as well as its contact position (contact direction). In this embodiment, for example, it can be detected which region of the main casing 15 (bumper 35) has come into contact with an object, out of a front-side region of the main casing 15 (bumper 35) containing a central position in the left-and-right direction and ranging to forward-side generally-equal left-and-right specified angles, a right-side region of a right side specified angle rightward neighboring the front-side region and ranging over a right-side portion of the main casing 15 (bumper 35), and a left-side region of a left side specified angle leftward neighboring the front-side region and ranging over a left-side portion of the main casing 15 (bumper 35).

The signal reception part 33 detects a radio signal from the charging device 12 to estimate a position of the charging device 12. For example, the signal reception part 33 is disposed in plurality on an outer circumferential surface in a front portion of the main casing 15 or the like.

The cleaning unit 17 includes an electric blower 37 positioned, for example, in the main casing 15 to suck in dust and dirt, a rotary brush 38 as a rotary cleaner rotatably attached at the suction port 22 to scrape up dust and dirt as well as a brush motor 39 for rotatably driving the rotary brush 38, side brushes 40 being auxiliary cleaning means (auxiliary cleaning units) as swinging cleaning units rotatably attached on both sides of front-side or other portions of the main casing 15 to scrape together dust and dirt as well as side brush motors 41 for driving the side brushes 40, a dust collecting part 42 for accumulating dust and dirt, and the like. In addition, as to the electric blower 37, the rotary brush 38 as well as the brush motor 39, and the side brushes 40 as well as the side brush motors 41, it is only required that at least any one of these members be provided.

The communication part 18 includes a transmission part 46 as transmission means such as an infrared-emitting element for transmitting radio signals (infrared signals) to the charging device 12 and the like. In addition, the communication part 18 may further include a wireless LAN device for transmitting and receiving radio signals with an external device via an access point or the like, or others.

The display part 19, which is to display clock time or time duration or various types of information related to the vacuum cleaner main body 11, is disposed at an upper portion of the main casing 15 as an example. In addition, the display part 19 may be provided as a touch panel or the like additionally having a function as input operation means (input operating part) which allows a user to directly input various types of settings as an example.

The control unit 20 is a microcomputer including a CPU, a timer, a counter and the like as an example, having a cleaning mode for, while autonomously traveling, carrying out cleaning by the cleaning unit 17 based on detection results of the sensor part 28; a return mode for searching for the charging device 12 and returning to the charging device 12; a charging mode for charging the secondary battery 21 via the charging device 12; and a standby mode applied during a standby state. Then, in the cleaning mode and the return mode, a plurality, e.g. two of traveling modes, i.e. a first traveling mode and a second traveling mode, are set.

Figure 6:
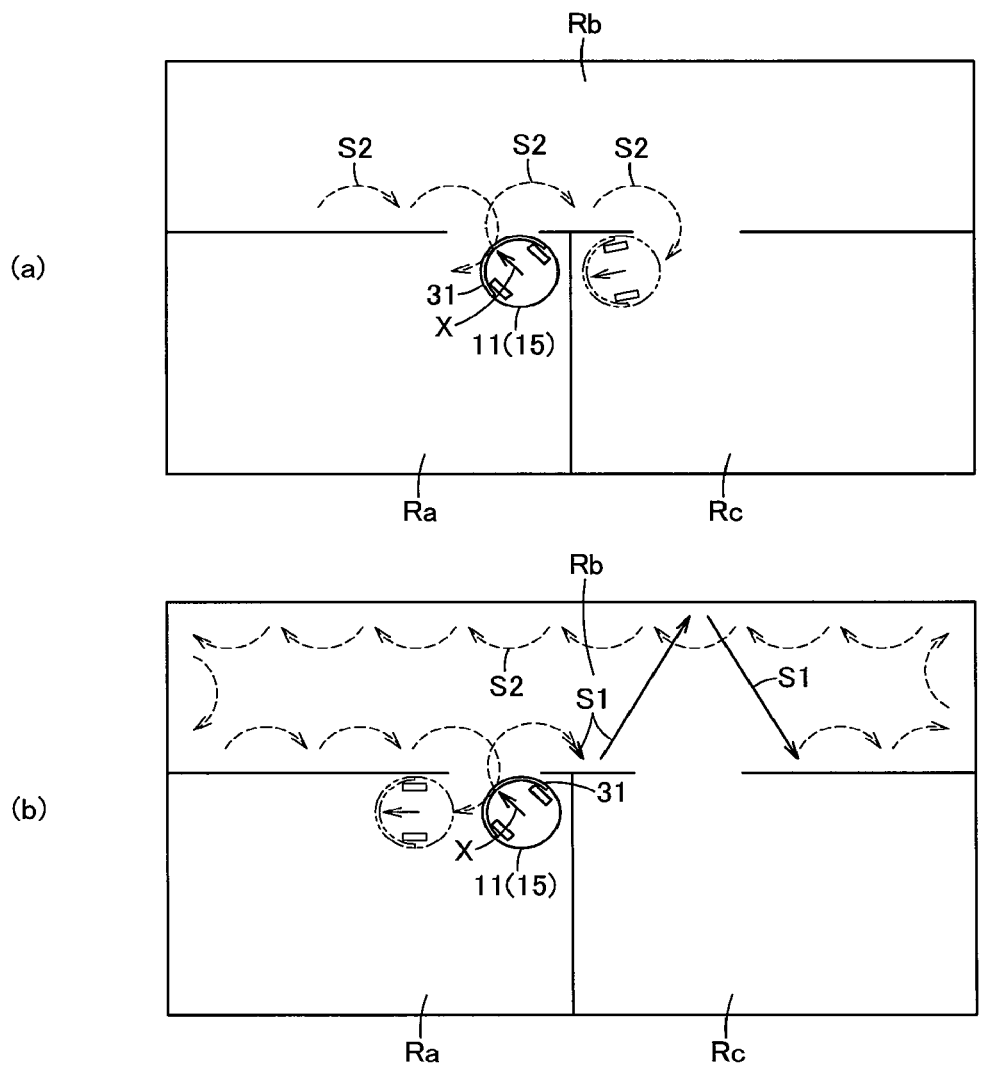
FIG. 6A is an explanatory view schematically showing an example of the traveling route upon a changeover from the second traveling mode to the first traveling mode of the autonomous traveling body.
FIG. 6B is an explanatory view schematically showing an example of a traveling route of another autonomous traveling body shown as a comparative example of the autonomous traveling body.

The first traveling mode is a mode for efficiently traveling in a region (open space) including few objects (obstacles), which can also be called a random-bound traveling mode, in which the vacuum cleaner main body 11 (main casing 15) travels straight in a room while turning its direction each time it has come to within a specified distance to an object (collided with an object). In this first traveling mode, operation of the motors 26, 26 (driving wheels 25, 25) is controlled so that the vacuum cleaner main body 11 (main casing 15) is made to travel straight, and that when an object within a specified distance is detected (contact with the vacuum cleaner main body 11 (main casing 15 (bumper 35)) is detected) by the object sensor 31, the vacuum cleaner main body 11 (main casing 15) is swung (spin turn) by a random swing angle within a specified angular range at the contact position so as to be changed randomly in traveling direction and made to further travel straight (shown by arrow S1 in FIGS. 4A and 4B and 6). Hereinbelow, the term "travel straight" refers to not only traveling ahead along a straight line, but also substantially traveling straight, i.e., traveling ahead along a circular arc or the like approximate to a straight line.

The second traveling mode is a mode for traveling in the vicinity of an object as an example, where the mode could be called an along-the-wall arch traveling mode, in which the vacuum cleaner main body 11 (main casing 15) travels so as to be repeatedly bound in an arched shape along an outer edge of a room such as an object (wall) or the like detected by the object sensor 31. In this mode, operation of the motors 26, 26 (driving wheels 25, 25) is controlled so that the vacuum cleaner main body 11 (main casing 15) is made to travel so as to draw a locus curved in a circular-arc shape (arched shape) along a wall, and that when it is detected by the object sensor 31 that a wall is positioned within a specified distance from the vacuum cleaner main body 11 (main casing 15) (that the vacuum cleaner main body 11 (main casing 15 (bumper 35)) has come into contact with a wall), the vacuum cleaner main body 11 (main casing 15) is swung (spin turn) by a specified angle toward a direction opposite to the wall at the contact position so as to change its direction and further travel in a circular-arc (arched) curved shape along the wall (shown by arrow S2 in FIGS. 4A and 4B and 6). In this embodiment, hereinafter, the second traveling mode is assumed as a so-called along-the-right-hand mode in which the vacuum cleaner main body 11 (main casing 15) travels while facing the wall on the right side of the vacuum cleaner main body 11 (main casing 15), in other words, while keeping the right side of the vacuum cleaner main body 11 (main casing 15) traveling along an object (wall). However, the second traveling mode may be an along-the-left-hand mode in which the operation is reversed between left and right, or these along-the-right-hand mode and along-the-left-hand mode may be changed over based on specified conditions.

The secondary battery 21 is electrically connected to charging terminals 48, 48 as connecting parts exposed on both sides in a rear portion of the lower surface of the main casing 15 as an example. By these charging terminals 48, 48 being electrically and mechanically connected to the charging device 12 side, the secondary battery 21 is charged via the charging device 12.

Meanwhile, the charging device 12 is disposed at a position non-obstructive of cleaning such as a vicinity of a wall. This charging device 12, as shown in FIGS. 1 and 3B, contains a charging circuit 52 to be used to charge the secondary battery 21 (FIG. 3A) and moreover includes terminals for charging 53, 53 as connection receiving parts electrically connected to the charging circuit 52, a power cord 54 for power supply use connected to a commercial power source and the like. The charging device 12 further includes a signal output part 55 as, for example, a left-and-right pair of signal output means such as an infrared-emitting element for outputting a radio signal (infrared signal) being a return-use guide signal for guiding the vacuum cleaner main body 11 to the charging device 12; a signal reception part 57 as signal reception means such as a phototransistor for receiving a radio signal (infrared signal) from the transmission part 46 of the vacuum cleaner main body 11, and a device control unit (device controller) 58 as device control means for controlling operation of these charging circuit 52, signal output part 55, signal reception part 57 and the like, individually.

The signal reception part 57 detects a radio signal (infrared signal) emitted from the transmission part 46 of the vacuum cleaner main body 11 to grasp a positional relationship between the vacuum cleaner main body 11 and the charging device 12 or the like.

The device control unit 58 generates a signal to be transmitted from the signal output part 55 or processes a signal received by the signal reception part 57 from the transmission part 46 of the vacuum cleaner main body 11, as an example. The device control unit 58 has a guidance mode for guiding the vacuum cleaner main body 11 toward the charging device 12; a charging mode for charging the secondary battery 21 via the charging circuit 52; and a standby mode for standing by for operation, where a radio signal is transmitted from the signal output part 55 in the guidance mode.

Next, operations of the above-described first embodiment will be described.

Generally, the vacuum cleaner device 10 performs, as roughly classified, cleaning work for carrying out cleaning by the vacuum cleaner main body 11 and charging work for charging the secondary battery 21 by the charging device 12. The cleaning work is composed of an udocking motion in which the vacuum cleaner main body 11 is undocked from the charging device 12, a cleaning motion in which cleaning is performed by the cleaning unit 17 after the udocking motion, a search motion in which search for the charging device 12 is conducted after or during the cleaning motion, an approach motion in which the vacuum cleaner main body 11 travels toward the charging device 12 detected by the search motion, a docking motion in which the vacuum cleaner main body 11 having approached the charging device 12 is docked with the charging device 12, and the like.

(Cleaning Work)

In the vacuum cleaner main body 11, at a timing of cleaning start such as when a preset cleaning-start time has come, the control unit 20 is changed over from the standby mode to the cleaning mode so that the cleaning unit 17, the traveling part 16 and the like are driven, where the vacuum cleaner main body 11 is udocked from the charging device 12, for example, linearly (undocking motion). In the charging device 12, the device control unit 58 is changed over from the standby mode to the guidance mode, for example, after a specified amount of time has elapsed since the undocking of the vacuum cleaner main body 11.

Next, the control unit 20 drives the driving wheels 25, 25 (motors 26, 26) in response to detection by the sensor part 28 so that the vacuum cleaner main body 11 (main casing 15), while avoiding obstacles or step gaps or the like, travels on a floor surface with the use of either the first traveling mode or the second traveling mode or with use of those traveling modes alternately in units of a specified time duration in a specified order, by which dust and dirt on the floor surface are cleaned and collected by the cleaning unit 17 (cleaning motion).

Then, when a specified condition is satisfied, for example, when the cleaning of the cleaning region is completed or when the capacity of the secondary battery 21 has decreased to such a specified level as to be insufficient for completing the cleaning (the voltage of the secondary battery 21 has dropped to around a discharge termination voltage), the control unit 20 is changed over to the return mode and, with the driving wheels 25, 25 (motors 26, 26) driven by the control unit 20, the vacuum cleaner main body 11, while traveling, searches for the charging device 12 (search motion).

In this search motion, the vacuum cleaner main body 11 travels, while changing over and using the first traveling mode or the second traveling mode, to detect whether or not a radio signal transmitted from the signal output part 55 of the charging device 12 is received by the signal reception part 33. In this case, search for the charging device 12 within a local region is performed in the first traveling mode, and the region of search is moved to another region in the second traveling mode. That is, when no radio signal outputted from the signal output part 55 of the charging device 12 is detected within the region by the signal reception part 33 with the use of the first traveling mode, i.e., when the charging device 12 is not found, it is decided that the charging device 12 is absent within the region, where the control unit 20 is changed over from the first traveling mode to the second traveling mode. When it is decided a specified number of times or more that the vacuum cleaner main body 11 (main casing 15) has traveled to a new, different region with the use of the second traveling mode, the control unit 20 is changed over from the second traveling mode to the first traveling mode.

Figure 7:
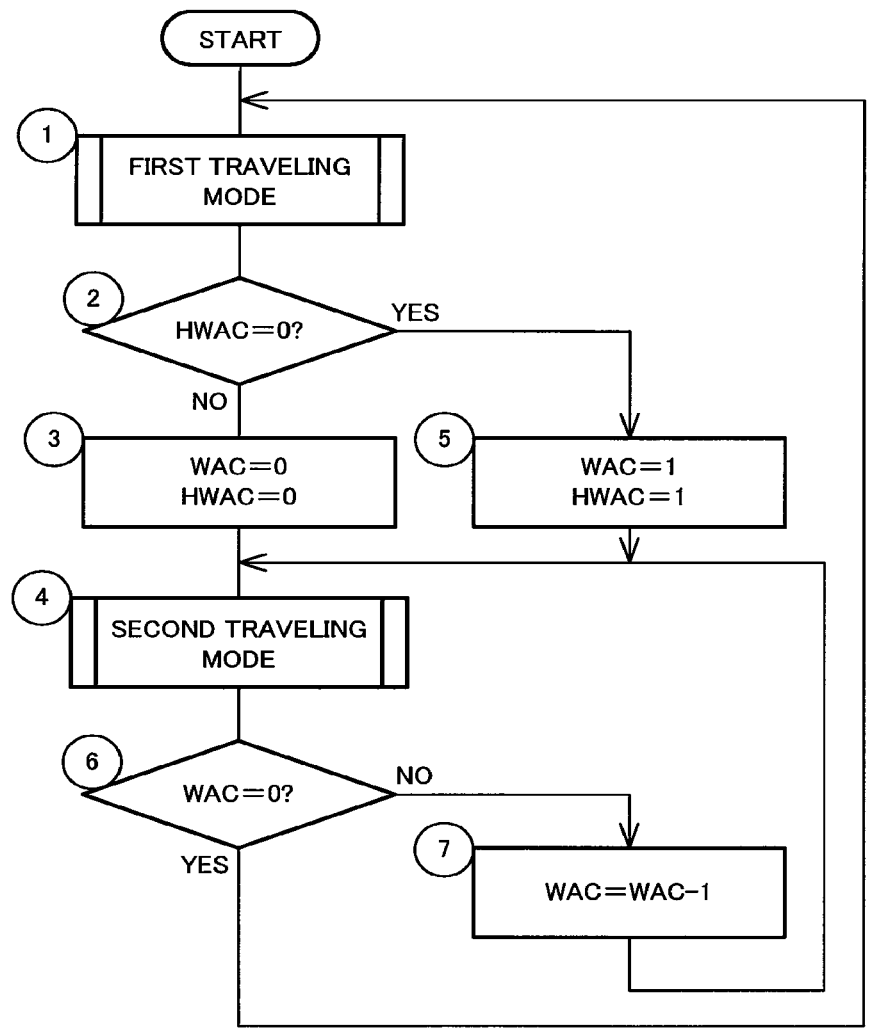
FIG. 7 is a flowchart showing control of a station device search motion by the autonomous traveling body.

A processing algorithm for this search motion is now described with reference to the flowchart shown in FIG. 7. First, the first traveling mode is executed (step 1). The control unit 20 decides whether or not a second-traveling-mode counter history HWAC stored in the control unit 20 is equal to 0 (step 2). If it is decided at this step 2 that the second-traveling-mode counter history HWAC is not 0, a second-traveling-mode counter WAC and the second-traveling-mode counter history HWAC stored in the control unit 20 are each set to 0 (step 3), followed by changeover to the second traveling mode (step 4). Meanwhile, if it is decided at step 2 that the second-traveling-mode counter history HWAC is 0, then the second-traveling-mode counter WAC and the second-traveling-mode counter history HWAC stored in the control unit 20 are each set to 1 (step 5), followed by moving to step 4.

After the second traveling mode in step 4, the control unit 20 decides whether or not the second-traveling-mode counter WAC is equal to 0 (step 6). Then, if it is decided at this step 6 that the second-traveling-mode counter WAC is not 0, the second-traveling-mode counter WAC is decremented by 1 (step 7), followed by returning to step 4. If it is decided at step 6 that the second-traveling-mode counter WAC is equal to 0, then the process flow returns to step 1.

Accordingly, in the vacuum cleaner main body 11, until a radio signal (guide signal) from the signal output part 55 of the charging device 12 is detected by the signal reception part 33, i.e., until the charging device 12 is found, the control unit 20 exerts such control that the number of execution times of the second traveling mode is changed to one time, two times, one time, two times, . . . , alternately for each one time execution of the first traveling mode. In other words, in the vacuum cleaner main body 11, the control unit 20 changes over the specified number of times for changeover from the second traveling mode to the first traveling mode each time the first traveling mode is changed over to the second traveling mode.

Figure 8:
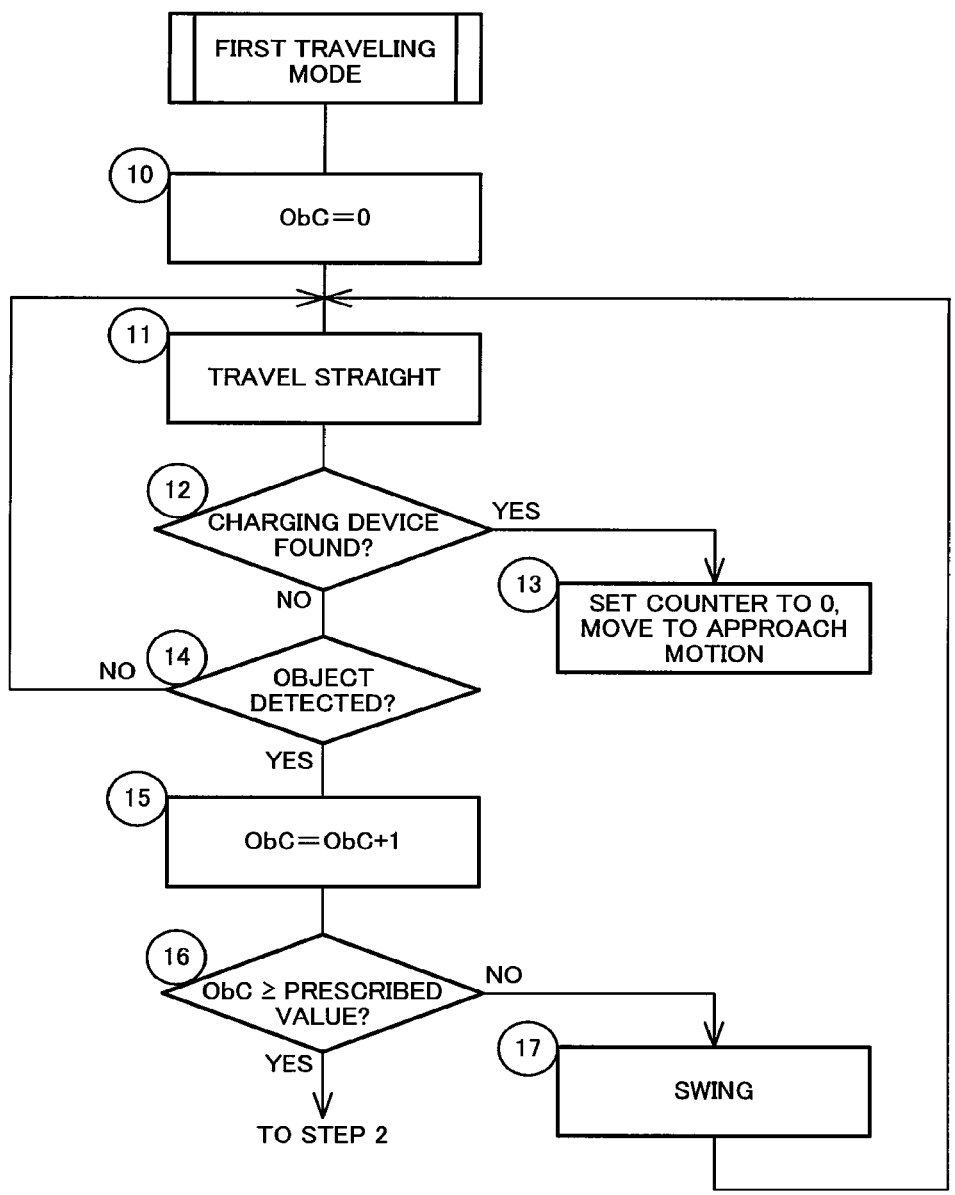
FIG. 8 is a flowchart showing control of the first traveling mode of the autonomous traveling body.

In the first traveling mode shown at step 1, unless a radio signal (guide signal) from the signal output part 55 of the charging device 12 is detected by the signal reception part 33, i.e., unless the charging device 12 is found, the first traveling mode is continued until it is decided that the vacuum cleaner main body 11 (main casing 15) has reached the same side as one side (a side identical to a side) on which the first traveling mode has been started, i.e. in this embodiment, until the number of times the vacuum cleaner main body 11 (main casing 15 (bumper 35)) has collided with objects comes to a specified number of times or more. For more description with reference to the flowchart shown in FIG. 8, in this first traveling mode, an object detection counter ObC stored in the control unit 20 is set to 0 (step 10), and the control unit 20 controls operation of the motors 26, 26 (driving wheels 25, 25) so as to make the vacuum cleaner main body 11 (main casing 15) travel straight (step 11).

Next, the control unit 20 decides whether or not a radio signal from the charging device 12 has been received via the signal reception part 33, i.e., whether or not the charging device 12 has been found (step 12). If it is decided that a radio signal from the charging device 12 has been received via the signal reception part 33, i.e., that the charging device 12 has been found, all the counters are set to 0, terminating the search motion and followed by moving to a later-described approach motion (step 13). Meanwhile, if it is decided at step 12 that no radio signal from the charging device 12 has been received via the signal reception part 33, i.e., that the charging device 12 has not been found, the control unit 20 decides whether or not an object within a specified distance has been detected via the object sensor 31, i.e., whether or not the main casing 15 (bumper 35) has come into contact with an object (step 14).

If it is decided at this step 14 that no object has been detected within a specified distance, i.e., that the main casing 15 (bumper 35) has not come into contact with an object, the process returns to step 11. Also, if it is decided at this step 14 that an object has been detected within a specified distance, i.e., that the main casing 15 (bumper 35) has come into contact with an object, the control unit 20 increments the object detection counter ObC by 1 (step 15). Thereafter, the control unit 20 decides whether or not the object detection counter ObC has come to a prescribed value or more, i.e., whether or not the main casing 15 (bumper 35) has collided with objects a specified number of times or more (step 16). In addition, the term "prescribed value" refers to a value corresponding to a number of times for changing the traveling direction due to collision with an object (number of times of collision), which is assumed to be necessary for the vacuum cleaner main body 11 (main casing 15) to reach the same side as the side on which the vacuum cleaner main body 11 (main casing 15) was located at the start time of the first traveling mode. The value is set to an odd number (e.g., three times) in this embodiment. Concretely, in the example shown in FIG. 4A, the vacuum cleaner main body 11 (main casing 15) reaches the same side as that of the start time of the first traveling mode when the number of times the object sensor 31 has detected (the main casing 15 (bumper 35) has collided with) an object P within a specified distance has come to an odd number (three times).

Then, if it is decided at step 16 that the object detection counter ObC has not come to a prescribed value or more, i.e., that the main casing 15 (bumper 35) has not collided with objects a specified number of times or more, the control unit 20 controls the operation of the motors 26, 26 (driving wheels 25, 25) so that the vacuum cleaner main body 11 (main casing 15) is swung (spin turn) to a random swing angle within a specified angular range (step 17), returning to step 11. Meanwhile, if it is decided at step 16 that the object detection counter ObC has come to the prescribed value or more, i.e., that the main casing 15 (bumper 35) has collided with objects a specified number of times or more, then the process proceeds to step 2.

Therefore, in the first traveling mode, unless a radio signal (guide signal) from the signal output part 55 of the charging device 12 is detected by the signal reception part 33, i.e., unless the charging device 12 is found, the first traveling mode is changed over to the second traveling mode when the vacuum cleaner main body 11 (main casing 15) has reached the same side as that of the start of the first traveling mode (when the number of times the vacuum cleaner main body 11 (main casing 15 (bumper 35)) has collided with objects has come to a specified number of times (prescribed value) or more.

Figure 9:
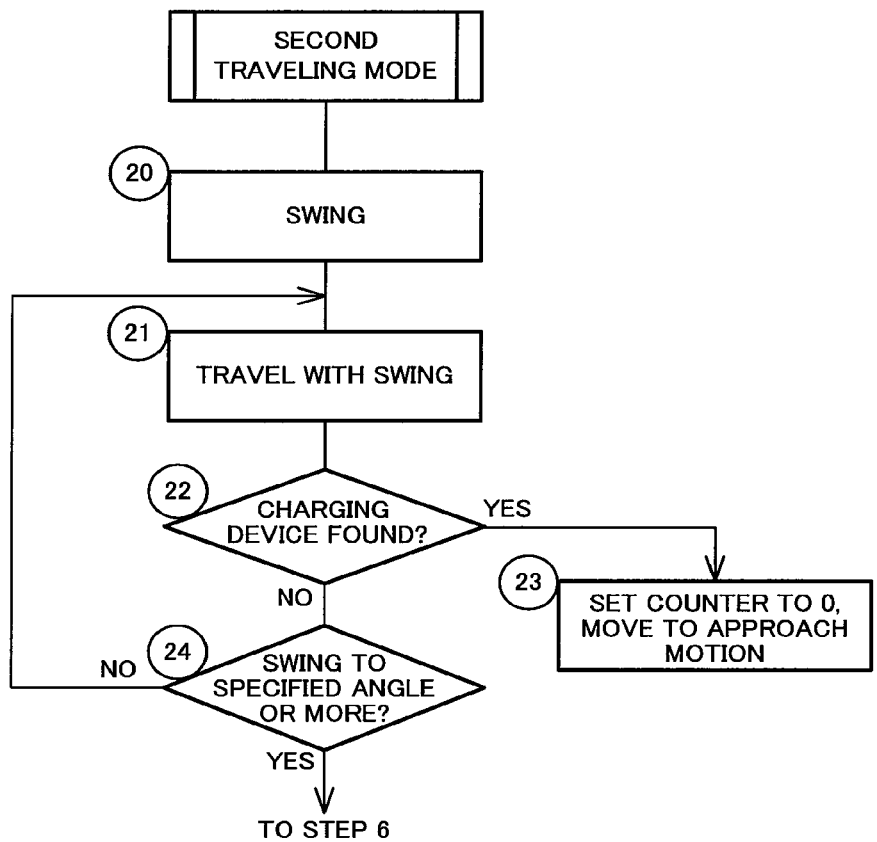
FIG. 9 is a flowchart showing control of the second traveling mode of the autonomous traveling body.

Further, in the second traveling mode shown in step 4, unless a radio signal (guide signal) from the signal output part 55 of the charging device 12 is detected by the signal reception part 33, i.e., unless the charging device 12 is found, the second traveling mode is continued until it is detected that the vacuum cleaner main body 11 (main casing 15) has traveled with a swing of a specified angle, 100° or more in this embodiment. For more explanation with reference to the flowchart shown in FIG. 9, in this second traveling mode, the control unit 20 controls the operation of the motors 26, 26 (driving wheels 25, 25) so that the vacuum cleaner main body 11 (main casing 15) is first swung to a specified angle in such a direction as to be separated from a wall (step 20). Then, the vacuum cleaner main body 11 (main casing 15) is made to travel in an arched shape toward the wall, i.e., travel while gradually swinging in a direction toward the wall (swinging travel (spin turn)) (step 21).

Next, the control unit 20 decides whether or not a radio signal from the charging device 12 has been received via the signal reception part 33, i.e., whether or not the charging device 12 has been found (step 22). If it is decided that a radio signal from the charging device 12 has been received via the signal reception part 33, i.e., that the charging device 12 has been found, all the counters are set to 0, where the search motion is ended, followed by moving to the later-described approach motion (step 23). Meanwhile, if it is decided at step 22 that a radio signal from the charging device 12 has not been received via the signal reception part 33, i.e., that the charging device 12 has not been found, the control unit 20 decides via the swing angle sensor 30 whether or not the vacuum cleaner main body 11 (main casing 15) has swung to a specified angle (e.g., 100°) or more (step 24).

If it is decided at this step 24 that the vacuum cleaner main body 11 (main casing 15) has not swung to a specified angle or more, the process returns to step 21. Also, if it is decided at this step 24 that the vacuum cleaner main body 11 (main casing 15) has swung to a specified angle or more, the process proceeds to step 6. Concretely, in the example shown in FIG. 5B, for example, the vacuum cleaner main body 11 (main casing 15), when swinging by 100° or more, moves from a traveling region Ra to a different, new region Rb.

Therefore, in the second traveling mode, unless a radio signal (guide signal) from the signal output part 55 of the charging device 12 is detected by the signal reception part 33, i.e., unless the charging device 12 is found, the second traveling mode is changed over to the first traveling mode on the condition that, when the vacuum cleaner main body 11 (main casing 15) has swung to a specified angle or more, the number of times of swinging to the specified angle or more, i.e. the number of times of movement to a different region, is a specified number of times or more.

Then, the vacuum cleaner main body 11 (main casing 15) is made to travel toward the charging device 12 searched for and detected by the search motion. As the vacuum cleaner main body 11 (main casing 15) moves closer to a specified distance thereto, the vacuum cleaner main body 11 (main casing 15) approaches the charging device 12 linearly along a radio signal (guide signal) outputted from the signal output part 55 with the charging terminals 48, 48 facing the charging device 12 (approach motion). During this approach motion, the vacuum cleaner main body 11 also performs an avoidance motion against objects (obstacles), step gaps, radio signals (infrared signals) from other devices, and the like. If a radio signal (guide signal) is detected after this avoidance motion, the approach motion is continued, where when a radio signal (guide signal) is no longer detected, the process returns to, for example, the search motion. Thereafter, the charging terminals 48, 48 are docked with the terminals for charging 53, 53 (docking motion). Then, upon completion of the docking between the vacuum cleaner main body 11 and the charging device 12, the control unit 20 stops the cleaning unit 17, the traveling part 16 and the like, thus ending the cleaning work.

In addition, when the charging device 12 is not found within a specified time duration (e.g. 30 min.) by the vacuum cleaner main body 11, or when the remaining capacity of the secondary battery 21 has decreased to a specified level or lower, or when loosening of the wheels or the dust collecting part 42 or the like has been detected, or on other occasions, the vacuum cleaner main body 11 stops performing the search motion, for example, where operations of individual parts are stopped at then-current places or specified positions, with an error display provided on the display part 19. As a result, the secondary battery 21 can be prevented from deterioration without using up the remaining capacity of the secondary battery 21.

Also, when a stop is inputted via the display part 19 or a remote controller or the like by a user during the search motion as an example, the search motion is ended. Thereafter, when a start is inputted via the display part 19 or the remote controller or the like by the user, the process is moved to the cleaning motion. That is, in this embodiment, it is assumed that the search motion does not temporarily stop nor resume.

(Charging Work)

After docking of the vacuum cleaner main body 11 with the charging device 12, when a specified timing, e.g. a preset charging start time, has come or when a specified amount of time has elapsed since the docking of the vacuum cleaner main body 11 with the charging device 12, the control unit 20 and the device control unit 58 each move to the charging mode to drive the charging circuit 52, starting the charging of the secondary battery 21. Then, if it is decided that the voltage of the secondary battery 21 has increased to a specified operable voltage, the control unit 20 and the device control unit 58 stop the charging by the charging circuit 52 to end the charging work, where the control unit 20 and the device control unit 58 each move to the standby mode.

As described above, according to the above-described first embodiment, in the first traveling mode in which the control unit 20 controls operation of the driving wheels 25 so as to make the main casing 15 travel straight and in which, when an object is detected by the object sensor 31, the main casing 15 is changed in traveling direction and made to travel straight, the control unit 20, if the charging device 12 is not found by the signal reception part 33 during travel within a region, is changed over to the second traveling mode in which the control unit 20 controls operation of the driving wheels 25 so as to make the main casing 15 travel in a curved shape along an object detected by the object sensor 31. In this second traveling mode, if it is decided that the main casing 15 has moved to a different region a specified number of times or more, the second traveling mode is changed over to the first traveling mode. Therefore, the search for the charging device 12 over a plurality of different regions can be fulfilled effectively in a short amount of time. That is, use of the second traveling mode makes it possible to more finely search for the charging device 12 along a wall or the like within a region, but it takes time for the search. Accordingly, the first traveling mode that allows short-time search within each region is basically used for the search for the charging device 12, and the second traveling mode is used only when the charging device 12 cannot be found in the first traveling mode so that the vacuum cleaner main body 11 (main casing 15) is allowed to travel into a different region. As a result, it is achievable for the vacuum cleaner main body 11 to find the charging device 12 in a short amount of time with higher efficiency.

Figure 5:
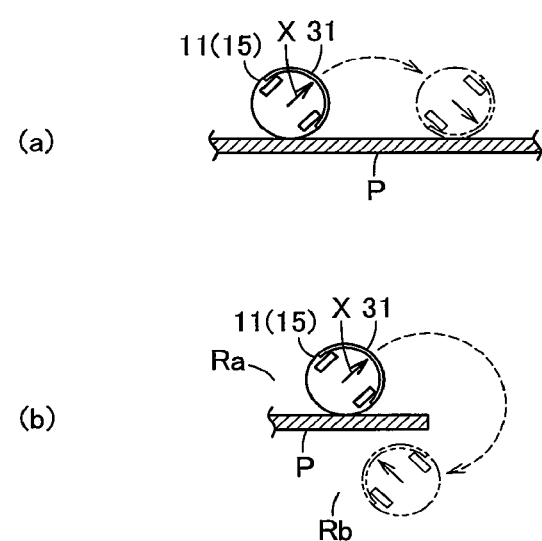
FIG. 5A is an explanatory view schematically showing a normal traveling in a second traveling mode of the autonomous traveling body.
FIG. 5B is an explanatory view schematically showing a case in which the autonomous traveling body moves to a different region in the second traveling mode.

Also, in the second traveling mode, when the swing angle of the vacuum cleaner main body 11 (main casing 15) is less than a specified angle, the vacuum cleaner main body 11 (main casing 15) only travels in an arched shape along an object (wall) P (FIG. 5A). However, when the swing angle is a specified angle or more, the vacuum cleaner main body 11 (main casing 15) is assumed to have reached the different region Rb over around the object (wall) P (FIG. 5B). Therefore, when it is detected that the vacuum cleaner main body 11 (main casing 15) has swung to a specified angle or more in the second traveling mode, the control unit 20 decides that the vacuum cleaner main body 11 (main casing 15) has moved to the different region Rb, followed by changing over to the first traveling mode. Thus, it can be decided with higher reliability that the vacuum cleaner main body 11 has reached the different region Rb.

Figure 4:
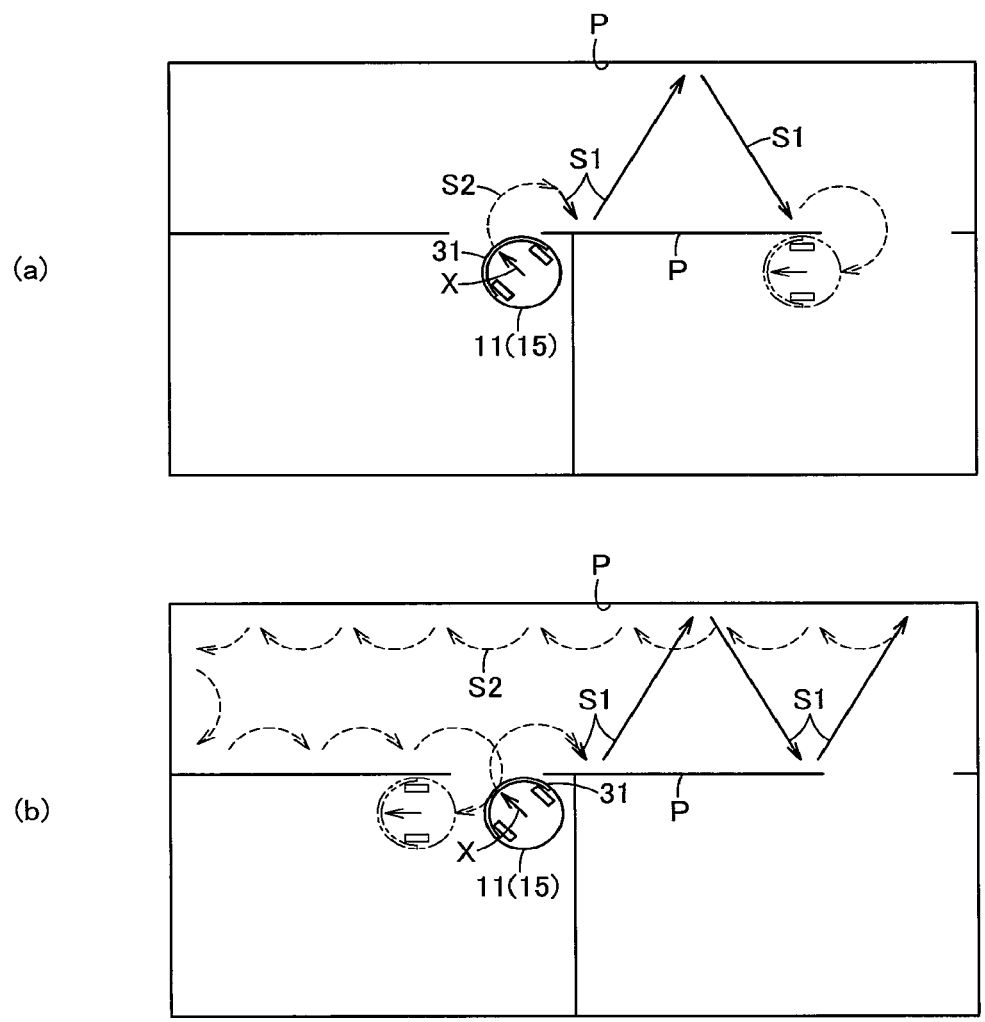
FIG. 4A is an explanatory view schematically showing an example of a traveling route in a first traveling mode of the autonomous traveling body.
FIG. 4B is an explanatory view schematically showing an example of a traveling route of another autonomous traveling body shown as a comparative example of the autonomous t raveling body.

Further, in the first traveling mode, after traveling straight toward an object, upon detection of an object within a specified distance by the object sensor 31, the vacuum cleaner main body 11 (main casing 15) is changed in traveling direction and made to travel straight. Therefore, when the control unit 20 is changed over to the second traveling mode at a position where the vacuum cleaner main body 11 (main casing 15) has reached one side opposite to the side on which the first traveling mode has been started, there is a possibility that the vacuum cleaner main body 11 (main casing 15) may return from the current region Rb to the traveling region Ra again (FIG. 4B). For this reason, when it is decided that, by the first traveling mode, the main casing 15 has reached the same side as that of the start of the first traveling mode, the control unit 20 is changed over to the second traveling mode, by which the probability that the vacuum cleaner main body 11 (main casing 15) may reach yet a different region Rc by the second traveling mode can be enhanced (FIG. 4A).

Then, during changeover from the second traveling mode to the first traveling mode, for example, if the control unit 20 changes the modes alternately every one time, there may be a return from the current region Rb to the traveling region Ra again (FIG. 6B). Accordingly, for the control unit 20, a specified number of times for changing over from the second traveling mode to the first traveling mode, i.e. a number of times the second traveling mode is executed successively before changing over to the first traveling mode, may be changed, e.g. as one time, two times, one time, two times, . . . , each time the first traveling mode is changed over to the second traveling mode, in which case the possibility that the vacuum cleaner main body 11 (main casing 15) will reach the yet different region Rc can be enhanced (FIG. 6A).

Figure 10:
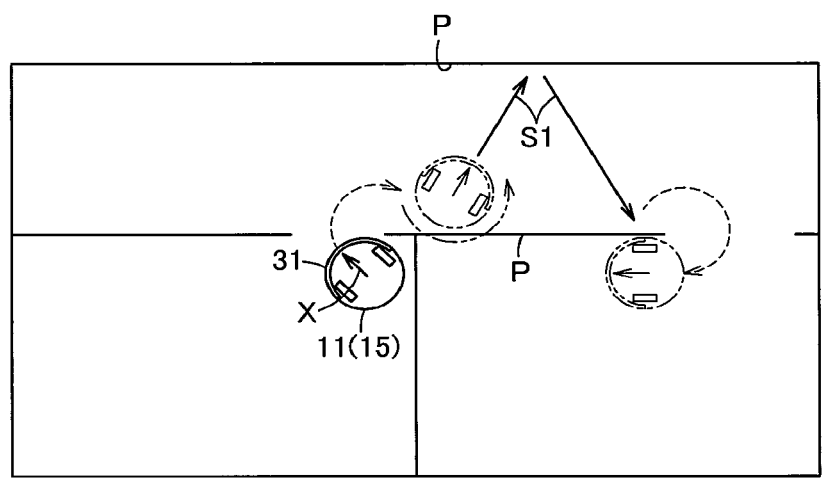
FIG. 10 is an explanatory view schematically showing an example of the traveling route in the first traveling mode of an autonomous traveling body of an autonomous traveling body device according to a second embodiment.

In addition, in the above-described first embodiment, as in a second embodiment shown in FIG. 10, upon changeover from the second traveling mode to the first traveling mode, the vacuum cleaner main body 11 (main casing 15) may be made to not travel straight as it is, but to be swung (spin turn) once in a direction opposite to the progressional direction (in such a direction as to be separated from the wall) and thereafter travel straight. In this case, since the number of times of detection of an object P (number of times of collision of the main casing 15 (bumper 35) with an object P) by the object sensor 31 until the vacuum cleaner main body 11 (main casing 15) reaches the same side as that of a start time of the first traveling mode becomes an even number of times, the same functional effects as in the above-mentioned first embodiment can be produced by setting the prescribed value to an even number, e.g. two times. That is, the changing over from the second traveling mode to the first traveling mode may be conditioned on arbitrary control. Therefore, the prescribed value in the above step 16 for deciding whether or not the first traveling mode is changed over to the second traveling mode may be so set that the changing over is done when the vacuum cleaner main body 11 (main casing 15) reaches the same side as that of start time of the first traveling mode, in response to the control for changing over from the second traveling mode to the first traveling mode.

Further, although the charging device 12 for charging the secondary battery 21 is used as the station device in the above-described individual embodiments, any arbitrary station device may be adopted such as a dust station for disposing of dust and dirt collected in the dust collecting part 42, for example.

Further, the cleaning motion may be started not only at the charging device 12 but at any arbitrary position in the cleaning region as well.

Also, the object sensor 31 may be provided by using a noncontact-type distance measuring sensor such as an ultrasonic sensor or an infrared sensor, in which case an object located within a specified distance is detected without making contact therewith.

Although a function as an autonomous traveling body is imparted to the vacuum cleaner main body 11, the autonomous traveling body is not limited to one for cleaning.

According to at least one of the above-described embodiments, the vacuum cleaner main body 11 is enabled to find the charging device 12 more efficiently. For example, even when cleaning is done over a plurality of regions, the vacuum cleaner main body 11 can be returned to the charging device 12 securely.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The travel control method for an autonomous traveling body as described above, further comprising the step of; changing over to the first traveling mode upon deciding that the main casing has moved to a different region when it is detected that the main casing has swung to a specified angle or more in the second traveling mode.

The travel control method for an autonomous traveling body as described above, further comprising the step of; changing over to the second traveling mode when it is decided that in the first traveling mode, the main casing has reached a side identical to a side on which the main casing has started the first traveling mode.

The travel control method for an autonomous traveling body as described above, further comprising the step of; changing over the specified number of times for changing over from the second traveling mode to the first traveling mode each time the first traveling mode is changed over to the second traveling mode.

The invention claimed is:

1. An autonomous traveling body device comprising; a station device installed on a traveling surface; and an autonomous traveling body including; a main casing; a driving wheel for enabling the main casing to travel on the traveling surface; an object sensor provided in the main casing and serving for detecting presence or absence of an object within a specified distance; a station device sensor for detecting the station device; and a control unit for controlling operation of the driving wheel based on detection by the object sensor and the station device sensor to thereby make the main casing autonomously travel, wherein the control unit has a first traveling mode for controlling the operation of the driving wheel so that the main casing is made to travel straight and, upon detection of an object by the object sensor, the main casing is changed in traveling direction and made to travel straight, and a second traveling mode for controlling the operation of the driving wheel so that the main casing travels in a curved shape along an object detected by the object sensor, and wherein the control unit is changed over to the second traveling mode when the station device is not found by the station device sensor during traveling within a region by the first traveling mode, and the control unit is changed over to the first traveling mode when it is decided a specified number of times or more that the main casing has moved to a different region by the second traveling mode.

2. The autonomous traveling body device in accordance with claim 1, wherein when it is detected that the main casing has swung to a specified angle or more in the second traveling mode, the control unit decides that the main casing has moved to a different region and the control unit is changed over to the first traveling mode.

3. The autonomous traveling body device in accordance with claim 1, wherein when it is decided that in the first traveling mode, the main casing has reached a side identical to a side on which the main casing has started the first traveling mode, the control unit is changed over to the second traveling mode.

4. The autonomous traveling body device in accordance with claim 1, wherein the control unit changes over the specified number of times for changing over from the second traveling mode to the first traveling mode each time the first traveling mode is changed over to the second traveling mode.

5. A travel control method for an autonomous traveling body for making a main casing autonomously travel based on detection of presence or absence of an object within a specified distance of the main casing by an object sensor as well as detection of a station device on a traveling surface by a station device sensor, the travel control method comprising: a first traveling mode in which the main casing is made to travel straight and, upon detection of an object within a specified distance of the main casing by the object sensor, the main casing is changed in traveling direction and made to travel straight; and a second traveling mode in which the main casing is made to travel in a curved shape along an object detected by the object sensor, the travel control method comprising:

changing over to the second traveling mode when the station device is not found by the station device sensor during traveling within a region by the first traveling mode; and changing over to the first traveling mode when it is decided a specified number of times or more that the main casing has moved to a different region by the second traveling mode.

* * * * *